US005295509A

United States Patent [19]

Suto et al.

[11] Patent Number: 5,295,509

[45] Date of Patent: Mar. 22, 1994

[54] PULSE NOZZLE

[75] Inventors: Osamu Suto; Eiji Suzuki; Norifumi Uehara, all of Ibaraki; Keiji Yoshimura; Masakazu Kuwabara, both of Hiroshima, all of Japan

[73] Assignees: Doryokuro Kakunenryo Kaihatsu Jigyodan; Mitsubishi Jukogyo Kabushiki Kaisha, Tokyo, Japan

[21] Appl. No.: 7,955

[22] Filed: Jan. 22, 1993

[30] Foreign Application Priority Data

Feb. 10, 1992 [JP] Japan ............................ 4-004839[U]

[51] Int. Cl.[5] ........................ F16K 31/02; F16K 3/316

[52] U.S. Cl. ............................ 137/625.33; 251/129.06

[58] Field of Search .............. 137/625.33; 251/129.06, 251/279

[56] References Cited

U.S. PATENT DOCUMENTS

| | | | |
|---|---|---|---|
| 2,641,871 | 6/1953 | Ray | 137/625.33 X |
| 2,933,100 | 4/1960 | Waterfill | 137/625.33 X |
| 4,530,317 | 7/1985 | Schutten | 251/129.06 X |
| 4,893,655 | 1/1990 | Anderson | 137/625.33 |
| 5,054,522 | 10/1991 | Kowanz et al. | 137/625.33 |
| 5,076,314 | 12/1991 | Ikehata et al. | 251/12.06 X |

FOREIGN PATENT DOCUMENTS

| | | | |
|---|---|---|---|
| 170438 | 11/1904 | Fed. Rep. of Germany . | |
| 1078392 | 3/1960 | Fed. Rep. of Germany . | |
| 2134223 | 8/1984 | United Kingdom | 251/129.06 |

*Primary Examiner*—Stephen M. Hepperle

[57] ABSTRACT

A pulse nozzle of a reaction apparatus which obtains a very low temperature by expanding high-pressure and normal-temperature gas in heat insulation manner includes a fixed slit member disposed at an inlet of the nozzle and having a plurality of slit openings, a movable slit member having similar slit openings disposed along the fixed slit member, and two piezoelectric-crystal elements driven by an external pulse signal to slidably move the movable slit member with respect to the fixed slit member repeatedly to thereby open and close a flow of gas in the pulse manner. A plurality of the pulse nozzles are disposed in parallel to increase the capacity of the pulse nozzle.

2 Claims, 3 Drawing Sheets

PULSE NOZZLE

FIELD OF THE INVENTION AND RELATED ART STATEMENT

The present invention relates to a pulse nozzle, and more particularly to a nozzle for improving the reaction efficiency and increasing the capacity of a reaction apparatus for generating a chemical reaction and a physical reaction at a very low temperature.

Until a recent date, it has been desired to develop a pulse nozzle more suitable for a reaction apparatus capable of obtaining a very low temperature by expanding high-pressure and normal-temperature gas in heat insulation manner.

Heretofore, in order to attain the nozzle of this kind, an solenoid controlled valve is used to feed fluid intermittently.

However, there is a problem that a repetition frequency of the intermittent feeding of the fluid by the solenoid controlled valve can not be increased since an electromagnetic driving portion of the solenoid controlled valve is broken by heat when the repetition frequency is increased to 10 Hz or more.

It is necessary to make large the solenoid controlled valve to process a large amount of fluid in order to improve the reaction efficiency of the reaction apparatus. However, when the solenoid controlled valve is made large, there is a problem that a driving power is increased and the repetition frequency of the intermittent feeding of the fluid is lowered extremely.

OBJECT AND SUMMARY OF THE INVENTION

The present invention has been made in view of the above problems and it is an object of the present invention to solve the problems by providing a pulse nozzle having a structure more suitable for the reaction apparatus and in which the repetition frequency of the intermittent feeding is improved to be high.

It is another object of the present invention to provide a pulse nozzle suitable for processing ōf a large amount of fluid without reduction of the repetition frequency to improve the efficiency of the reaction apparatus.

In order to attain the above objects, the present invention is configured as described in the following (1) and (2):

(1) The pulse nozzle of the reaction apparatus obtaining a very low temperature by expanding high-pressure and normal-temperature gas in heat insulation manner, comprises:

a fixed slit member disposed at an inlet of the pulse nozzle and having a plurality of slit openings, a movable slit member disposed to be slidably moved with respect to the fixed slit member and having a plurality of similar slit openings disposed at a position coincident with that of the plurality of slit openings of the fixed slit member when the pulse nozzle is open, and two piezoelectric-crystal elements supporting both ends of the movable slit member, respectively, for driving to slidably move the movable slit member from the both ends thereof.

The pulse nozzle is characterized in that the two piezoelectric-crystal elements are driven in cooperative manner in the same direction by a pulse signal supplied externally and when the plurality of slit openings of the movable slit member being slidably moved coincide with the plurality of slit openings of the fixed slit member, the pulse nozzle is opened while when the openings do not coincide the pulse nozzle is not opened.

(2) A plurality of pulse nozzles described in (1) are characterized to be disposed in parallel.

In operation of the present invention, the movable slit member is slidably moved by being driven by the two piezoelectric-crystal elements supporting both ends of the movable slit member and when the slit openings of the movable slit member coincide with the slit openings of the fixed slit member, the pulse nozzle is opened so that a flow of gas occurs.

When the slit openings of the movable slit member is deviated from the slit openings of the fixed slit member and do not coincide with the slit openings, the pulse nozzle is closed so that the flow of gas is stopped. Thus, a pulse flow of gas occurs.

Further, a plurality of the pulse nozzles are disposed in parallel and are operated simultaneously, so that a large amount of pulse flow of gas can be obtained.

According to the pulse nozzle of the present invention, the pulse flow of gas having the improved intermittent feeding of gas and increased repetition frequency can be obtained and can be applied to the reaction apparatus.

A large-sized structure of the pulse nozzle which can not be attained heretofore due to restriction of a driving power of the piezoelectric-crystal element operating as a drive source of the movable slit member can be attained and can be applied to the processing of a large amount of gas.

The pulse flow of gas passes through a nozzle portion and is expanded in heat insulation manner to be a gas flow having a very low temperature. A period of generating the very low temperature gas is made coincident with an irradiation period of laser light for reaction to thereby be able to improve the reaction efficiency and increase the capacity of the reaction apparatus.

DETAILED DESCRIPTION OF PREFERRED EMBODIMENTS

Preferred embodiments of the present invention are now described in detail with reference to the accompanying drawings.

[First Embodiment]

Figure 1:
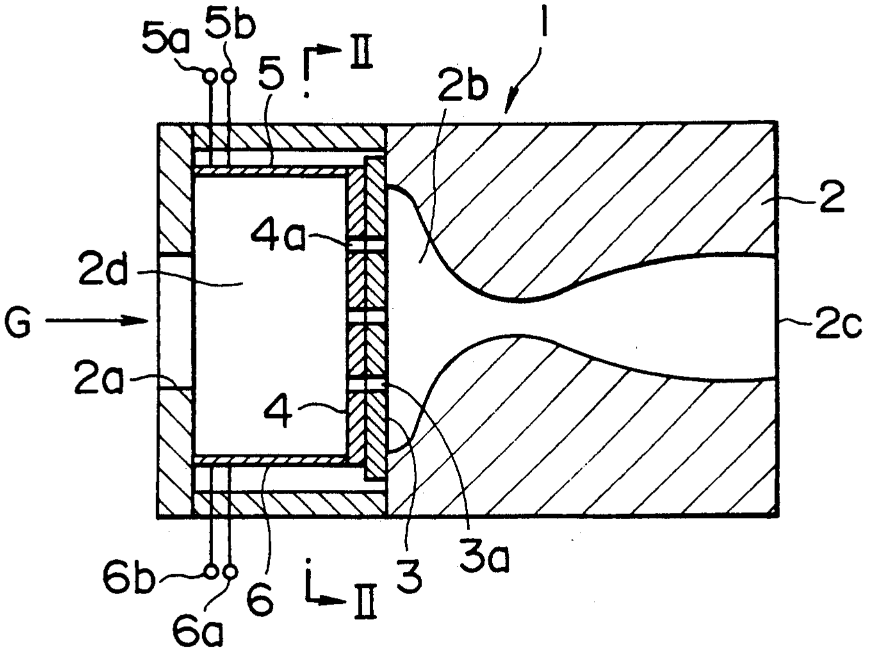
FIG. 1 is a sectional view showing a pulse nozzle according to a first embodiment of the present invention and taken along line I—I of FIG. 2.
Figure 2:
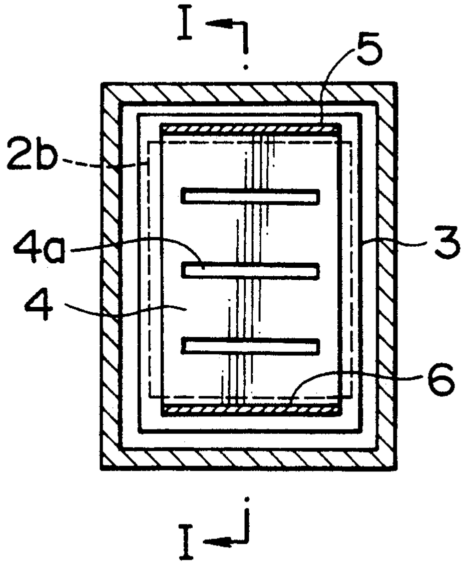
FIG. 2 is a sectional view taken along line II—II of FIG. 1.

FIGS. 1 and 2 are sectional views of a pulse nozzle 1 according to a first embodiment of the present invention, which is used in a reaction apparatus which obtains a very low temperature by expanding high-pressure and normal-temperature gas in heat insulation manner.

A nozzle portion 2 of the pulse nozzle 1 includes a nozzle opening 2*b* communicating with a nozzle inlet 2*a* and having an inner portion being narrowed on the way thereof and a nozzle outlet 2*c* which is opened with an enlarged diameter. A fixed slit member 3 having a plurality of slits (three slits in FIG. 1) 3a formed perpendicularly to a flow of gas G and the nozzle opening 2b is fixedly disposed in an inlet side chamber 2d of the nozzle portion 2.

A movable slit member 4 having a width of, for example, about 50 mm and including a plurality of slits 4a similar to the slit 3a is disposed to be slidably moved while the plane of the movable slit member 4 is in contact with the plane of the fixed slit member 3. The plurality of slits 4a are positioned to coincide with the plurality of slits 3a of the fixed slit member 3 when the pulse nozzle 1 is opened.

Two piezoelectric-crystal elements 5 and 6 having one ends supporting both upper and lower sides of the movable slit member 4 to drive to be slidably moved the movable slit member 4 and the other ends fixedly attached to a fixed portion of the pulse nozzle 1 are disposed in the inlet side chamber 2d of the nozzle portion 2. Numerals 5a, 5b and 6a, 6b denote connection terminal of the piezoelectric-crystal elements 5 and 6, respectively.

Operation of the pulse nozzle 1 is now described with reference to FIG. 3.

An external pulse generator 7 is connected through lead wires 8 to connection terminals 5a, 5b and 6a, 6b of the two piezoelectric-crystal elements 5 and 6, respectively, for slidably moving the movable slit member 4 of the pulse nozzle 1, so that the same pulse voltage is applied to drive the two piezoelectric crystal elements 5 and 6 in the same direction.

The pulse nozzle 1 shown in FIG. 1 includes the piezoelectric crystal elements 5 and 6 which are not applied with a voltage from the pulse generator 7 and the piezoelectric crystal elements 5 and 6 are returned to the original position by the returning force thereof so that the plurality of slits 4a of the movable slit member 4 coincide with the plurality of slits 3a of the fixed slit member 3 to open the pulse nozzle 1. At this time, the flow of gas G is sent from the nozzle inlet 2a maintained to a high pressure to the nozzle outlet 2c maintained to a low pressure by a compressor or the like.

Figure 3:
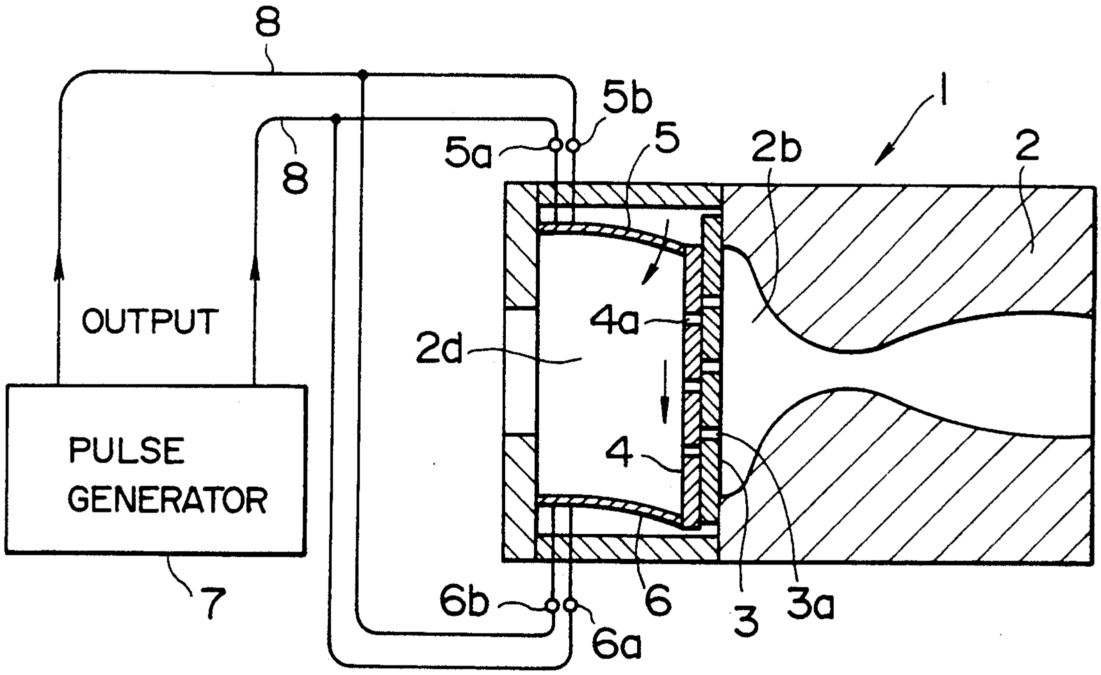
FIG. 3 schematically illustrates operation of the pulse nozzle of the embodiment.

As shown in FIG. 3, when the voltage from the pulse generator 7 is applied to the piezoelectric-crystal elements 5 and 6 through the terminals 5a, 5b and 6a, 6b, respectively, the piezoelectric-crystal elements 5 and 6 are driven in the same direction of arrow to be deflected so that the piezoelectric-crystal elements 5 and 6 slidably move the movable slit member 4 in the direction of arrow of FIG. 3. Consequently, the plurality of slits 4a of the movable slit member 4 do not coincide with the plurality of slits 3a of the fixed slit member 3, so that the pulse nozzle 1 is closed. Accordingly, it is stopped to sent gas from nozzle inlet 2a to the nozzle outlet 2c.

Accordingly, the voltage generated by the pulse generator 7 is applied to the piezoelectric crystal elements 5 and 6 in the pulse manner, so that gas can be sent from the nozzle inlet 2a to the nozzle outlet 2c intermittently.

When the pulse nozzle 1 is closed, seal of the slits is made by plane contact of the fixed slit member 3 and the movable slit member 4.

[Second Embodiment]

It is necessary to make large the pulse nozzle to process a large amount of gas in order to improve the reaction efficiency of the reaction apparatus, while if the fixed slit member 3, the movable slit member 4 and the piezoelectric-crystal elements 5 and 6 are made large in the first embodiment, there is a problem that the movable slit member 4 is not slidably moved by a pressure of gas and the flow of gas G in the form of pulse does not occur.

This is caused by the fact that since the driving force of the piezoelectric-crystal elements 5 and 6 used in the pulse nozzle 1 is limited, the driving force of the piezoelectric crystal elements 5 and 6 is exceeded when the movable slit member 4 is made large. A factor of preventing or disturbing increase of the capacity of the pulse nozzle is that the movable slit member 4 having a size capable of being slidably moved by the driving force of the piezoelectric crystal elements 5 and 6 must be used.

Figure 4:
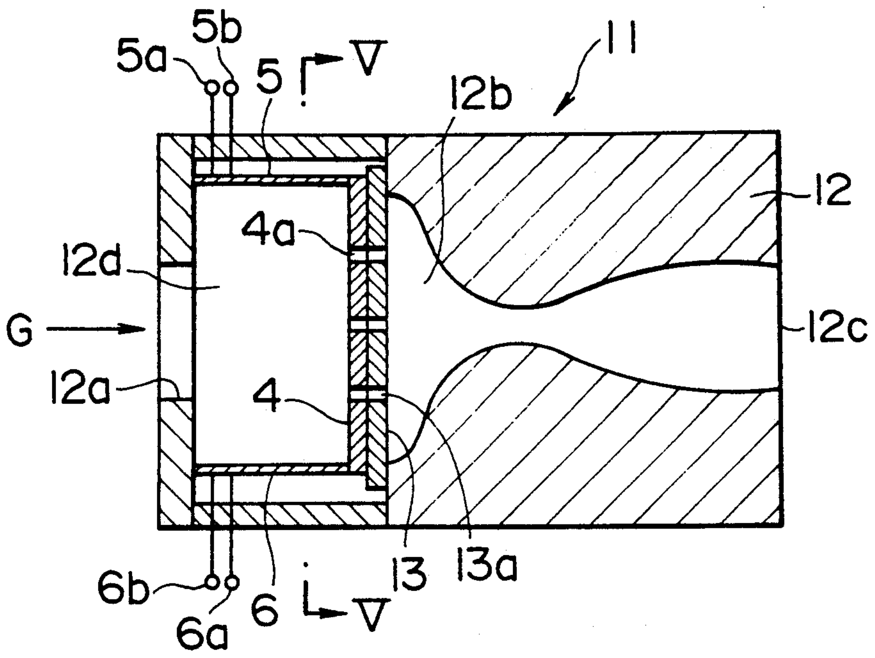
FIG. 4 is a sectional view showing a second embodiment of the present invention.
Figure 5:
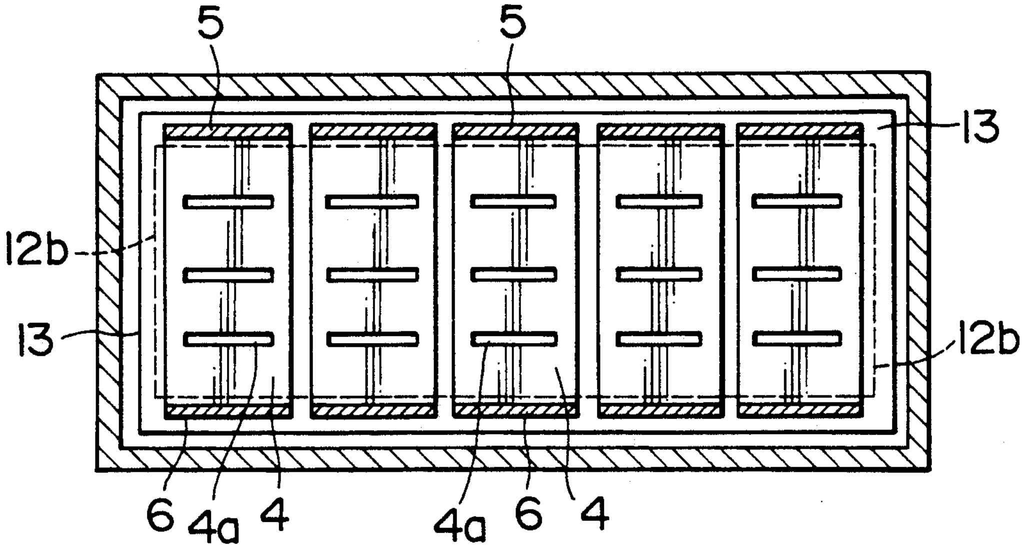
FIG. 5 is a sectional view taken along line V—V of FIG. 4.

FIGS. 4 and 5 show a second embodiment of the present invention which shows a pulse nozzle 11 in section including a plurality (five sets in this embodiment) of the pulse nozzles 1 of the first embodiment disposed in parallel in order to solve the problems in the first embodiment.

A nozzle portion 12 of the pulse nozzle 11 includes a nozzle opening 12b communicating with a nozzle inlet 12a and having an inner portion being narrowed on the way thereof and a nozzle outlet 12c which is opened with an enlarged diameter. A plurality of fixed slit members (five sets in FIGS. 4 and 5) 13 put side by side and having a plurality of slits (three slits in FIG. 4) 13a arranged vertically in FIG. 5 are disposed perpendicularly to the flow of gas G and the nozzle opening 12b in an inlet side chamber 12d of the nozzle portion 12.

As shown in FIGS. 4 and 5, a plurality (five sets in Figures) of movable slit members 4 having a width of about 50 mm and a plurality of pairs of piezoelectric-crystal elements 5 and 6 for driving to slidably move the movable slit members 4 with respect to the fixed slit members 13 are disposed in the inlet side chamber 12d of the nozzle portion 12 to be slidably moved to the fixed slit members 13.

The plurality of pairs of piezoelectric-crystal elements 5 and 6 are driven simultaneously in the same direction by a pulse generator not shown connected externally.

The same elements as those of FIGS. 1 and 2 are designated by the same numerals and description thereof is omitted.

In the embodiment, the pulse nozzle 11 includes a plurality of pulse nozzle 1 of the first embodiment disposed in parallel, while the number of the pulse nozzle 1 can be increased or reduced properly in accordance with a desired capacity of the pulse nozzle 11.

When the number of the movable slit member 4 and the pair of piezoelectric-crystal elements 5, 6 is five, the overall width of the movable slit members 4 is five times of the width of the pulse nozzle 1 and the capacity of the pulse nozzle 11 is also five times of the pulse nozzle 1 of the first embodiment.

The present invention is not limited to the embodiment, while the present invention can be attained by using other means having the similar function and various modification and addition can be made thereto without departing from the scope of the present invention.

We claim:

1. A pulse nozzle of a reaction apparatus which obtains a very low temperature by expanding high-pressure and normal-temperature gas in heat insulation manner, comprising:

a fixed slit member disposed in an inlet side of said pulse nozzle and including a plurality of slit openings, a movable slit member disposed to be slidably moved with respect to said fixed slit member and including a plurality of similar slit openings positioned to coincide with said plurality of slit openings of said fixed slit member when said pulse nozzle is opened, and two piezoelectric-crystal elements supporting both sides of said movable slit member for driving to slidably move said movable slit member from the both sides;

said two piezoelectric-crystal elements being driven by an external pulse signal in cooperative manner in the same direction so that said pulse nozzle is opened when said plurality of slit openings of said movable slit member being slidably moved coincide with said plurality of slit openings of said fixed slit member and said pulse nozzle is closed when said openings of said members do not coincide.

2. A pulse nozzle comprising a plurality of said pulse nozzles according to claim 1 disposed in parallel.

* * * * *